United States Patent
Chaplow et al.

(10) Patent No.: US 10,415,528 B2
(45) Date of Patent: Sep. 17, 2019

(54) VEHICLE PEPS SYSTEM CALIBRATION USING A MOBILE DEVICE

(71) Applicant: GM Global Technology Operations LLC, Detroit, MI (US)

(72) Inventors: Caroline Chaplow, Burketon (CA); Vyacheslav Berezin, Newmarket (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 235 days.

(21) Appl. No.: 15/639,039

(22) Filed: Jun. 30, 2017

(65) Prior Publication Data
US 2019/0003439 A1   Jan. 3, 2019

(51) Int. Cl.
| F02N 11/08 | (2006.01) |
| B60R 25/24 | (2013.01) |
| G07C 5/00 | (2006.01) |
| G07C 9/00 | (2006.01) |

(52) U.S. Cl.
CPC .......... *F02N 11/0807* (2013.01); *B60R 25/24* (2013.01); *F02N 11/0803* (2013.01); *G07C 5/00* (2013.01); *G07C 9/00309* (2013.01); *B60R 2325/205* (2013.01); *G07C 2009/00341* (2013.01); *G07C 2009/00357* (2013.01); *G07C 2009/00507* (2013.01); *G07C 2009/00984* (2013.01); *G07C 2209/63* (2013.01)

(58) Field of Classification Search
CPC ...... G07C 9/00309; G07C 2009/00793; G07C 2209/63; G07C 9/00182; G07C 9/00111; G07C 9/00944; G07C 2209/64; G07C 2209/65; G07C 9/00126
USPC ........................................................ 340/5.72
See application file for complete search history.

(56) References Cited

U.S. PATENT DOCUMENTS

| 9,859,998 B2* | 1/2018 | Li ................. H04B 17/3913 |
| 2012/0244877 A1* | 9/2012 | Margalef .............. G01S 5/0252 455/456.1 |
| 2016/0320469 A1 | 11/2016 | Laifenfeld et al. |

FOREIGN PATENT DOCUMENTS

DE      102012204673 A1    9/2012

OTHER PUBLICATIONS

German Office Action corresponding to DE application No. 10 2018 115 663.4, dated Nov. 26, 2018, 6 pages.

\* cited by examiner

*Primary Examiner* — Mark S Blouin
(74) *Attorney, Agent, or Firm* — Reising Ethington P.C.; David Willoughby (57) ABSTRACT

A method of operating a passive entry passive start (PEPS) system includes authenticating the mobile wireless device, detecting a presence of the mobile wireless device in a specified location in an interior of the vehicle, and calibrating one or more operating parameters of the PEPS system based on radio frequency (RF) performance characteristics of the mobile wireless device.

20 Claims, 3 Drawing Sheets

VEHICLE PEPS SYSTEM CALIBRATION USING A MOBILE DEVICE

INTRODUCTION

The present invention relates to passive entry passive start (PEPS) systems used in vehicles and, more particularly, to calibrating the PEPS system with respect to individual mobile wireless devices used to control vehicle access as part of a PEPS system.

BACKGROUND

Modern vehicles use wireless key fobs that restrict both interior access as well as the ability to operate the vehicle. Authorized vehicle users can carry a wireless key fob and as they approach the vehicle, the PEPS system can determine whether the unique wireless signal transmitted by the key fob is authorized for access and/or operation of the vehicle. If so, the vehicle user can enter and subsequently start the vehicle. More specifically, the PEPS system defines a plurality of virtual zones surrounding the vehicle and monitors these zones for the presence of the key fob. Each of the zones is generally associated with a different level of vehicle access and functionality. In some cases, the presence of the key fob being detected in a particular zone may automatically initiate one or more vehicle functions.

When initially introduced, PEPS systems and key fobs communicated using wireless signals that fall on the low end of the frequency spectrum (e.g., ~30-400 kHz). However, with the continued advancement of technology, vehicles are more frequently becoming equipped with an ability to facilitate communication with other wireless devices using short-range wireless signals through various wireless protocols, such as Bluetooth Low-Energy (LE) or Wi-Fi. Consequently, PEPS systems previously dedicated to low-frequency signal transmission are being replaced with PEPS systems configured to communicate using the Bluetooth LE and/or Wi-Fi communication technologies. With these advanced wireless communications capabilities, the PEPS systems are also being configured to use mobile wireless devices to control vehicle access and functionality in lieu of, or in addition to, key fobs.

When using a mobile wireless device for passive vehicle entry, the PEPS system determines the location of the mobile device using data obtained from the wireless signals communicated between the vehicle and the mobile device. In one implementation, the location of the mobile device is determined using performance variables associated with the wireless signals, such as signal strength and/or signal direction. For example, determining the location may include a calculation that compares a plurality of known distance-to-signal strength values stored at the vehicle to performance variables measured at various nodes of the vehicle. That is, signal strength values for each amount of distance from the vehicle can be stored and referred to when calculating the location of the mobile device. However, radio frequency (RF) performance characteristics (e.g., transmit power, receiver sensitivity, and antenna gain) vary by design from one mobile device to another, which may impact the performance and accuracy of the PEPS system in determining the location of the mobile device. In other words, when there are variances in the mobile device RF performance characteristics relative to the stored performance variables used to determine location, the PEPS system may inaccurately identify the location of the mobile device, and thus, the presence of the mobile device within a particular zone. As a result, the mobile device may be unable to obtain vehicle access and/or functionality that would otherwise be associated with its location.

To provide consistency in its performance and accuracy, it may be desirable to calibrate a vehicle PEPS system with respect to the RF performance characteristics associated with each individual mobile wireless device used by authorized users of the same vehicle.

SUMMARY

According to an embodiment of the invention, there is provided a method of operating a passive entry passive start (PEPS) system of a vehicle with respect to a mobile wireless device. The method includes authenticating the mobile wireless device; detecting a presence of the mobile wireless device in a specified location in an interior of the vehicle; and calibrating one or more operating parameters of the PEPS system based on radio frequency (RF) performance characteristics of the mobile wireless device, wherein the wireless communication between the vehicle and the wireless mobile device is carried out using a short-range wireless communications protocol, a cellular communications protocol, or both, and includes at least one of a Bluetooth Low Energy (LE) protocol, an IEEE 802.11 protocol, or both.

In one example, the step of authenticating includes an exchange of virtual keys authorizing the mobile wireless device to access the vehicle, operate the vehicle, or both.

In one implementation, the method further includes prompting a user to authorize calibration of the wireless mobile device and to place the wireless mobile phone in the specified location, wherein the specified location is a cradle communicatively coupled to the PEPS system.

In one example, determining the RF performance characteristics of the mobile wireless device according to the disclosed method includes sampling wireless communication signals between the vehicle and the wireless mobile device to determine a performance variable associated with the wireless communication signals, wherein the performance variable includes a received signal strength indicator (RSSI).

In one implementation, the method further includes comparing the RF performance characteristics of the mobile wireless device to default RF performance characteristics stored in the PEPS system and calibrating the one or more operating parameters of the PEPS system based on the comparison, wherein the one or more operating parameters of the PEPS system include distance-to-signal strength values used to determine a location of the mobile wireless device relative to the vehicle and one or more virtual zone boundaries.

In one example, the step of calibrating includes transmitting a plurality of signals to the mobile wireless device at the specified location in the vehicle and receiving a plurality of response signals from the mobile wireless device, wherein the plurality of response signals includes a received signal strength detected at the mobile wireless device in response to the plurality of transmitted signals, or calibration information relating to the one or more operating parameters calculated at the mobile wireless device in response to the plurality of transmitted signals.

According to another embodiment of the invention, there is provided a method of operating a PEPS system of a vehicle with respect to a mobile wireless device. The method includes authenticating the mobile wireless device authorizing the mobile wireless device to access the vehicle, operate the vehicle, or both, initiating a calibration procedure and prompting a user to place the mobile wireless device in a specified location in an interior of the vehicle, determining RF performance characteristics of the mobile wireless device based on one or more calibration signals communicated between the mobile wireless device and the vehicle using at least one of a Bluetooth Low Energy (LE) protocol, an IEEE 802.11 protocol, or both, and calibrating one or more operating parameters of the PEPS system used to determine a location of the mobile wireless device based on the determined RF performance characteristics of the mobile wireless device.

According to yet another embodiment of the invention, there is provided a PEPS system for a vehicle that includes a vehicle system module configured to determine a location of a mobile wireless device relative to the vehicle. The vehicle system module is configured to authenticate the mobile wireless device authorizing the mobile wireless device to access the vehicle, operate the vehicle, or both; initiate a calibration procedure and prompt a user to place the mobile wireless device in a specified location in an interior of the vehicle in response to the authentication; determine RF performance characteristics of the mobile wireless device based on one or more calibration signals communicated between the mobile wireless device and the vehicle using at least one of a Bluetooth Low Energy (LE) protocol, an IEEE 802.11 protocol, or both; and calibrate one or more operating parameters of the PEPS system used to determine the location of the mobile wireless device based on the RF performance characteristics of the mobile wireless device determined using the one or more calibration signals.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE
ILLUSTRATED EMBODIMENT(S)

The system and method described below are directed to operating a passive entry passive start (PEPS) system of a vehicle with respect to a mobile wireless device, and more particularly, to calibrating the PEPS system according to the RF performance characteristics associated with each mobile wireless device authorized for use with the vehicle PEPS system.

Communications System

Figure 1:
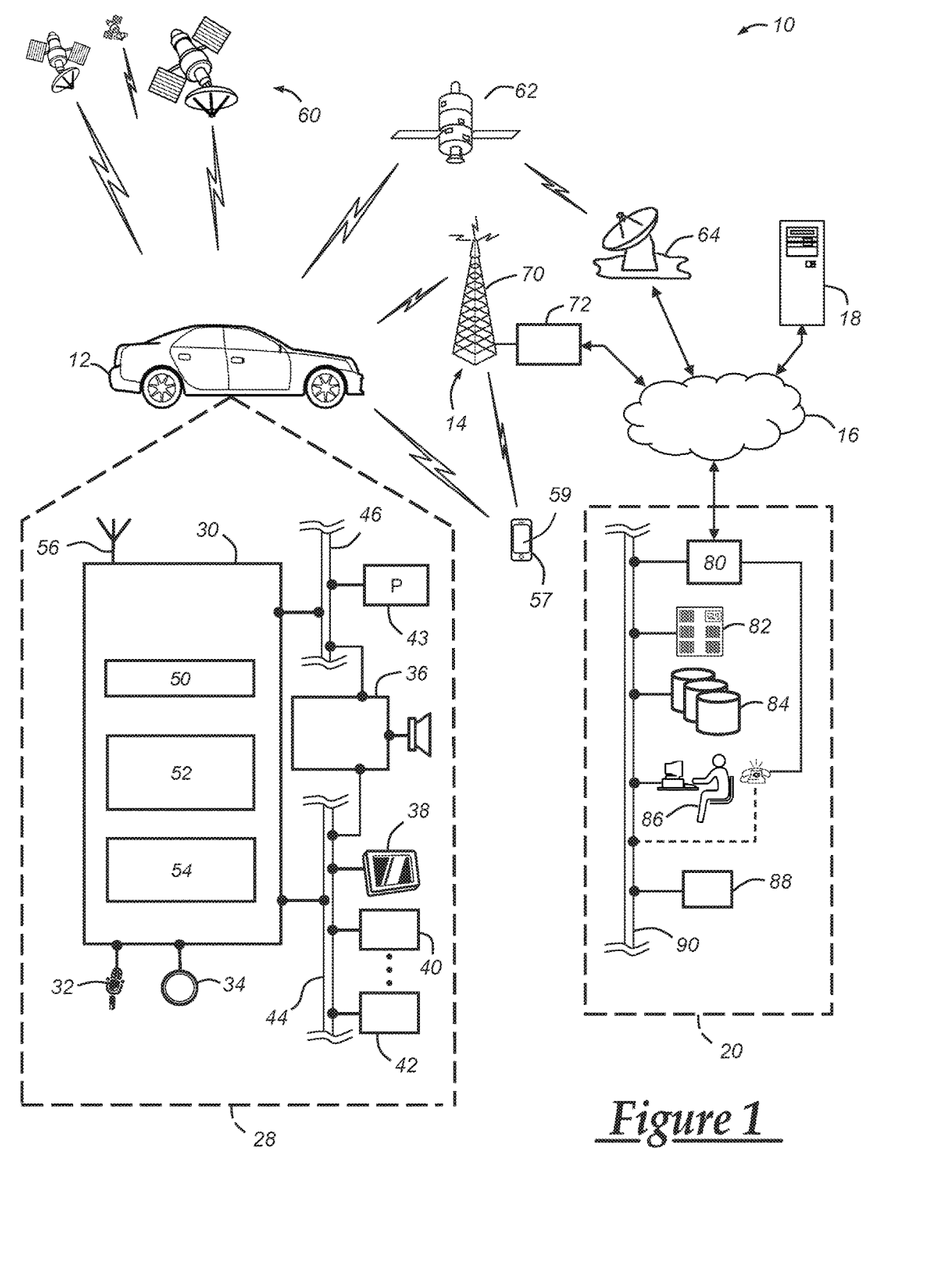
FIG. 1 is a block diagram depicting an embodiment of a vehicle that is capable of using the method disclosed herein.

With reference to FIG. 1, there is shown an operating environment that comprises a mobile vehicle communications system 10 that can be used to implement the method disclosed herein. Communications system 10 generally includes a vehicle 12, one or more wireless carrier systems 14, a land communications network 16, a computer 18, and a remote facility 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, bicycles, e-bikes, etc., can also be used. Some of the vehicle electronics 28 are shown generally in FIG. 1 and include a telematics unit 30, a PEPS module 43, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over a wireless carrier system and via wireless networking. This enables the vehicle to communicate with call centers, other telematics-enabled vehicles, or some other entity or device. The telematics unit preferably uses radio transmissions to establish a communications channel (a voice channel and/or a data channel) with a wireless carrier system so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at a call center) and data communication (e.g., to provide GPS location data or vehicle diagnostic data to the call center), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more short-range wireless protocols, including short range wireless communication (SRWC) such as any of the IEEE 802.11 protocols, WiMAX, ZigBee™, Wi-Fi direct, Bluetooth LE, or near field communication (NFC). When used for packet-switched data communication such as TCP/IP, the telematics unit can be configured with a static IP address or can set up to automatically receive an assigned IP address from another device on the network such as a router or from a network address server.

One of the networked devices that can communicate with the vehicle 12, and more specifically to telematics unit 30, VSMs 42, and/or PEPS module 43, is a wireless mobile device 57 capable of wireless communications. For example, the device 57 may be a vehicle operator's or user's cellular telephone or other personal mobile device, and may include: hardware, software, and/or firmware enabling cellular telecommunications and/or short-range wireless communication (SRWC), as well as other wireless device functions and applications. The hardware of mobile device 57 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)), and which may be used to carry out all or part of the method disclosed herein. The application may be configured to allow a vehicle user to communicate with vehicle 12 through various communication protocols, and to allow the vehicle user to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 57 to view information pertaining to the vehicle (e.g., the current location of the vehicle, whether the vehicle is locked or unlocked) and/or pertaining to an account associated with the user or vehicle. In addition, the application may also allow the user to connect with the remote facility 20 or call center advisors at any time.

The mobile device 57 may further include a transceiver capable of communicating using a short-range wireless protocol (e.g., Wi-Fi, Bluetooth, etc.) and a visual display 59. In some implementations, the visual display 59 also includes a touch-screen graphical user interface and/or a GPS module capable of receiving GPS satellite signals and generating GPS coordinates based on those signals. Mobile device 57 is shown as a smartphone having cellular telephone capabilities, but may also include, without limitation, a tablet, laptop computer, or any other suitable device.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation of GPS satellites. From these signals, the module 40 can determine vehicle position that is used for providing navigation and other position-related services to the vehicle driver. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing and another VSM 42 can be a powertrain control module that regulates operation of one or more components of the vehicle powertrain. Yet another VSM 42 can be a body control module (BCM) that governs various electrical components located throughout the vehicle, like the vehicle's power door locks, engine ignition, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

A passive entry passive start (PEPS) module 43 is another type of VSM that can be connected to the vehicle bus 44 and provide passive detection of the absence or presence of a passive physical key or a virtual vehicle key. The PEPS module 43 can use its own antenna or receive signals via antenna 56. In some embodiments, mobile device 57 may be able to act as a passive entry key and may be provided a key or other information that authorizes the device to access the vehicle. When the passive physical key or mobile device 57 with virtual vehicle key approaches, the PEPS module 43 can determine if the passive physical key belongs to the vehicle 12 and/or (in some embodiments) determine if the virtual vehicle key is authorized/authentic. If the virtual vehicle key is authentic, the PEPS module 43 can send a command to the BCM permitting access to the vehicle 12. In other implementations, it is possible for the BCM or other VSM 42 to carry out the functionality attributed to the PEPS module 43.

In one scenario, the virtual key may be implemented in conjunction with a car sharing service whereby a remote facility coordinates car rentals or ride sharing, such as remote facility 20. The remote facility may generate and issue a virtual key (e.g., a string or array of bits) to the mobile device 57 and to the vehicle 12. The mobile device 57 may then securely pass the virtual key to the vehicle (e.g., via an established SRWC connection) and the vehicle may then determine if the virtual key is authorized to access the vehicle and/or the level of access the virtual key provides or is associated with (e.g., full vehicle functionality, only unlocking/locking features). The application may enable such virtual key management and functionality. Independent of the scenario or specific implementation, once the vehicle authenticates and/or authorizes the virtual key (or the mobile device or the user of the mobile device), the vehicle may automatically carry out one or more vehicle functions or may receive one or more commands from the mobile device, wherein the one or more commands instruct the vehicle to perform one or more vehicle functions or a suite of functions, as will be discussed more below.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or digital technologies such as CDMA (e.g., CDMA2000) and GSM/GPRS as well as 4G LTE or 5G LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 20, or both. A computer 18 can also be used for providing Internet connectivity such as DNS services or as a network address server that uses DHCP or other suitable protocol to assign an IP address to the vehicle 12.

Remote facility 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
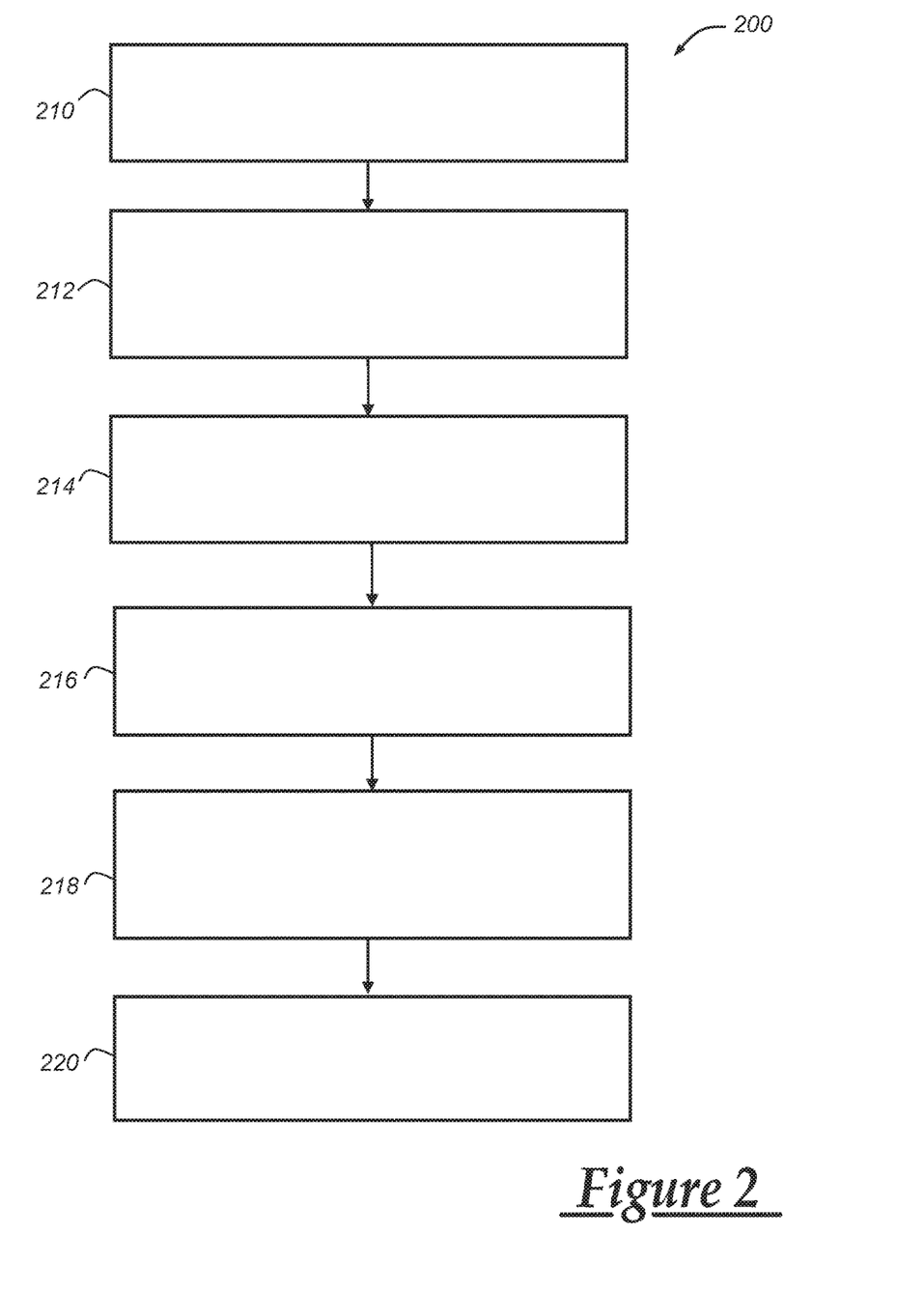
FIG. 2 is a flow chart depicting an embodiment of a method of operating a passive entry passive start (PEPS) system of a vehicle with respect to a mobile wireless device.

Turning now to FIG. 2, there is shown an embodiment of a method 200 of operating a passive entry passive start (PEPS) system of a vehicle with respect to a mobile wireless device in accordance with the system 10 illustrated in FIG. 1. The disclosed method is implemented by the system 10 described above, wherein the PEPS system 43 and the mobile device 57 are configured to communicate wirelessly according to short-range wireless communications protocols, cellular communications protocols, or both. The short-range wireless communications protocols include, without limitation, any of the IEEE 802.11 protocols, WiMAX, ZigBee™, Wi-Fi direct, Bluetooth LE, or near field communication (NFC). The disclosed method may be triggered according to a variety of circumstances, including, but not limited to: when a suitable application is installed onto the mobile device 57; when the mobile device 57 is initially paired with the vehicle 12; when the mobile device 57 is detected in a cradle or other designated location in the interior of the vehicle 12; or when a user initiates calibration of the mobile device 57 through one of the vehicle user interfaces. It should be understood that the steps of the method 200 are not necessarily presented in any particular order and that performance of some or all the steps in an alternative order is possible and is contemplated.

The method 200 begins at step 210 by authenticating the mobile wireless device 57. In one embodiment, the authentication occurs prior to the initial or first use of the mobile device 57 with the vehicle 12. In accordance with known techniques, authentication may refer to the initial exchange of digital certificates or keys as described above, thereby authorizing the mobile device 57 to establish connections with the vehicle 12 and to access and/or operate the vehicle 12.

At step 212, a calibration procedure is initiated and the user is prompted to position or place the mobile wireless device in a specified location in an interior of the vehicle. The calibration may be initiated in response to the authentication of the mobile device, or may alternatively be initiated in response to a request from the user through one of the vehicle user interfaces. The specified location may refer to a cradle or other type of device holder or interface positioned at a fixed location in the interior of the vehicle 12. In this way, each mobile device 57 connected to the PEPS system is calibrated from the same location. When the calibration is initiated automatically, the vehicle, through one of the user interfaces, may prompt the user to authorize the calibration.

At step 214, the radio frequency (RF) performance characteristics of the mobile device are determined by sampling wireless communication signals between the vehicle 12 and the wireless mobile device 57. In one implementation, sampling the wireless signals includes transmitting one or more signals to the mobile wireless device 57 positioned at the known specified location in the vehicle 12. The transmitted signals are calibration signals directed to determining the RF characteristics of the mobile device 57 such as, for example, transmit power, receiver sensitivity, and antenna gain. The mobile wireless device 57, via an installed application, is configured to receive the calibration signals and to determine one or more performance variables that can include signal strength and/or signal direction. In one implementation, the performance variables are determined by measuring a received signal strength indicator (RSSI) of the calibration signals.

At step 216, the vehicle 12 is configured to receive one or more response signals from the mobile wireless device 57 that may include the performance variables such as the received signal strength indicator (RSSI) detected at the mobile wireless device 57 in response to the transmitted calibration signals. In another implementation, the mobile wireless device 57, via the installed application, is configured to calculate calibration information relating to one or more operating parameters of the PEPS system based on the transmitted calibration signals. Thus, the response signals sent to the vehicle 12 from the mobile wireless device 57 may include the calibration information relating to the RF performance characteristics of the mobile device 57.

At step 218, the vehicle 12, and in particular the PEPS module 43, is configured to compare the performance variables included in the received signals to known baseline or benchmark RF performance characteristics associated with a predefined "sample" mobile wireless device. The baseline RF performance characteristics relating to the sample mobile device are used as a default by the PEPS system to determine the location of the mobile device 57 and to define a set of default virtual zone boundaries.

Figure 3:
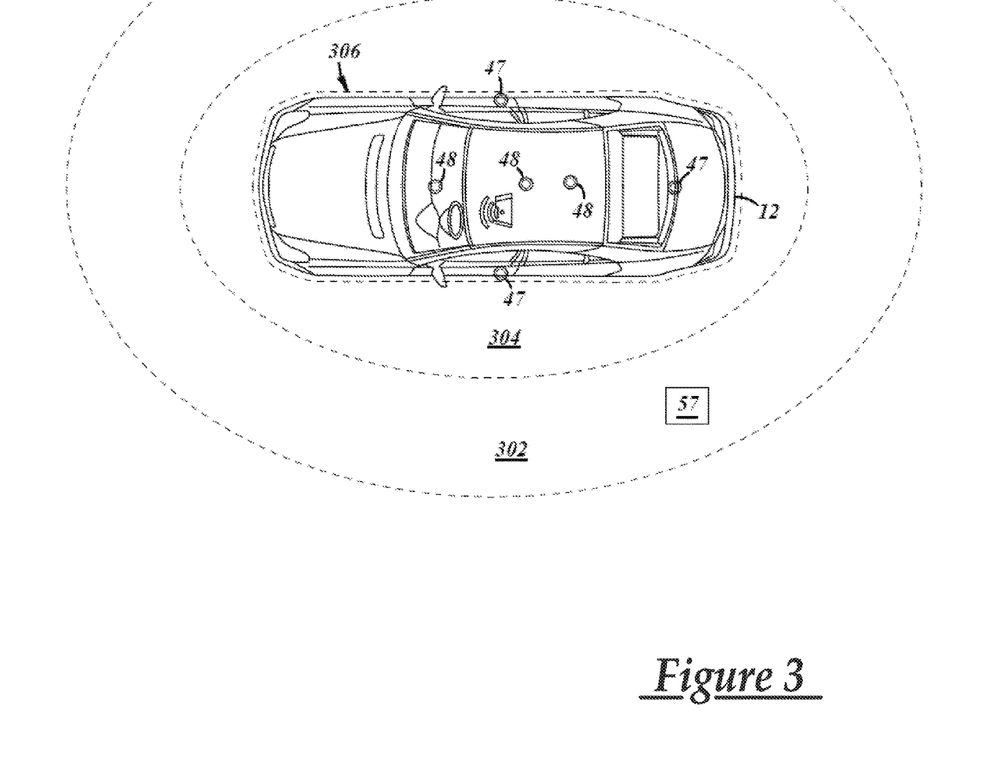
FIG. 3 is a projection view of an embodiment of a vehicle that is capable of using the method disclosed herein.

As described above, the virtual zones surrounding the vehicle 12 are defined and monitored for the presence of the wireless mobile device 57 within each of these zones. A projection view of the vehicle 10 is shown in FIG. 3 with an implementation of a plurality of short-range wireless communication (SRWC) nodes, such as, for example, Bluetooth LE nodes 47, Wi-Fi nodes 48, and the plurality of virtual zones. The PEPS module 43 receives information from Bluetooth LE nodes 47 and/or Wi-Fi nodes 48 to detect the presence of the mobile device 57 within a zone. In one implementation, the vehicle 12 can be surrounded by three virtual zones: a connection or approach zone 302, a passive entry zone 304, and a vehicle interior zone 306.

These zones can each be associated with different vehicle functions. The PEPS system is configured to determine vehicle access based on the location of an authenticated device. In the connection/approach zone 302, the vehicle 12 can initially detect the presence of the mobile device 57 using the SRWC signal it transmits. While in the connection/approach zone 302, the vehicle 12 can authenticate the mobile device 57, but choose not to take any further action unless the mobile device 57 comes closer to the vehicle 12. By authenticating the mobile device 57, but activating no other vehicle function, the vehicle 12 can be ready for a vehicle occupant yet still remain in a power-saving mode in the event that the vehicle 12 is parked near the mobile device 57 despite no forthcoming intention on the part of a user to operate the vehicle 12. This can occur when the mobile device 57 remains in an owner's pocket while near the vehicle 12, or leaves the mobile device 57 nearby the vehicle 12.

As the mobile device 57 is brought closer to the vehicle 12, the mobile device 57 can enter a passive entry zone 304 where the vehicle 12 can initiate a number of vehicle functions in anticipation that the user will soon use the vehicle 12. The vehicle 12 can continue to receive the SRWC signal from the mobile device 57 at more than one node 47, 48 and using the performance data from signal measurements gathered at each of the nodes 47, 48, accurately determine the distance of the mobile device 57 from the vehicle 12. For example, the body control module VSM 42 can unlock the doors, turn on the exterior lights, and/or move the driver's seat to one of a number of previously-stored positions. In another example, when the authenticated mobile device 57 is in the passive entry zone 304, the PEPS system will allow the door to be unlocked when the door handle is pressed. If the authenticated mobile device 57 is in the vehicle interior zone 306, the PEPS system will allow the vehicle to be started when the 'Start" button, for example, is pressed. The passive entry zone 304 can be defined by the area between the exterior surfaces of the vehicle 12 to the boundary of the connection/approach zone 302 nearest the vehicle 12. The nodes 47, 48 are shown spaced apart in the vehicle doors, the trunk area, the instrument panel, the center console, and the rear seat of the vehicle 12. However, it should be appreciated that the nodes 47, 48 can be combined together in a unit that shares a common housing in implementations other than what is shown in FIG. 3.

The baseline RF performance characteristics are used to determine a plurality of known default distance-to-signal strength values that are stored at the vehicle 12. That is, signal strength values for each amount of distance from the vehicle 12 can be stored and referred to when calculating the location of the mobile device 57. In one example, a lookup table can include a distance value that corresponds to a plurality of signal strength values the number of which can correspond to the number of nodes 47, 48 used. The signal strength values detected from the nodes can be matched to the signal strength values in the lookup table. When a match is found, the distance to the mobile device 57 can be determined. The distance-to-signal strength values can be further refined by data indicating the angle at which the signal is received.

As a result of the comparison performed at step 218, at step 220 the PEPS module 43 compensates for a difference between the RF performance characteristics of the mobile device 57 and the known baseline RF performance characteristics. In one implementation, the compensation includes calibrating one or more parameters of the PEPS system, which includes the known default distance-to-signal strength values stored at the vehicle 12 for the sample mobile device. By calibrating the default distance-to-signal strength values, the virtual zone boundaries are likewise calibrated. Consequently, the distance-to-signal strength values and the virtual zone boundaries are calibrated for the specific RF performance characteristics associated with all mobile devices used for the same vehicle.

With respect to method 200, the mobile devices 57 and vehicle 12 are described as using signals sent using SRWC protocols. However, it should be understood that other configurations of this method can implement the PEPS system calibration using cellular protocols. Moreover, multiple methods for implementing the calibration communication between the vehicle 12 and the mobile wireless device 57, which is positioned in the interior of the vehicle, are contemplated. For example, the mobile device 57 may be configured to receive signals from vehicle; read and store RSSI values relating to the signals; then transmit the RSSI values to the vehicle 12, wherein the vehicle 12 uses the RSSI values to determine a variance from the stored benchmark. In another implementation, the mobile device 57 is configured to receive signals from vehicle 12; read and store RSSI values relating to the signals; calculate a variance from the benchmark; then transmit the calculated variance to vehicle 12. In another implementation, the vehicle 12 is configured to receive signals from mobile device 57; read and store RSSI values relating to the signals; then use the RSSI values to determine a variance from the benchmark. In yet another implementation, the vehicle 12 is configured to receive signals from mobile device 57; read and store RSSI values relating to the signals; then transmit the RSSI values to the mobile device 57, wherein the mobile device 57 is configured to calculate a variance from the benchmark and thereafter transmit the variance to vehicle 12. In each of the above implementations, the variance is used to calibrate the one or more parameters of the PEPS system as described above with respect to step 220.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of calibrating a passive entry passive start (PEPS) system of a vehicle with respect to mobile wireless devices authorized for use with the PEPS system, the method comprising the steps of:
 (a) authenticating a mobile wireless device to establish wireless communication and authorization to access the vehicle, operate the vehicle, or both;
 (b) detecting a presence of the mobile wireless device at an interface communicatively coupled with the PEPS system, wherein the interface is positioned at a fixed location in an interior of the vehicle, such that the PEPS system is calibrated with respect to each mobile wireless device authorized for use with the PEPS system from the same fixed location in the vehicle;
 (c) determining radio frequency (RF) performance characteristics of the mobile wireless device from the fixed location; and
 (d) calibrating one or more operating parameters of the PEPS system based on the RF performance characteristics of the mobile wireless device.

2. The method of claim 1, wherein the interface in step (b) is a cradle communicatively coupled to the PEPS system.

3. The method of claim 1, further including prompting a user to place the wireless mobile phone at the interface in response to step (a).

4. The method of claim 1, further including prompting the user to authorize calibration of the wireless mobile device in response to step (a).

5. The method of claim 1, wherein step (c) further includes determining the RF performance characteristics of the mobile wireless device by sampling wireless communication signals between the vehicle and the wireless mobile device.

6. The method of claim 5, wherein determining the RF performance characteristics of the mobile wireless device includes determining a performance variable associated with the wireless communication signals.

7. The method of claim 5, wherein the wireless communication between the vehicle and the wireless mobile device is carried out using a short-range wireless communications protocol, a cellular communications protocol, or both.

8. The method of claim 7, wherein the short-range wireless communications protocol includes at least one of a Bluetooth Low Energy (LE) protocol, an IEEE 802.11 protocol, or both.

9. The method of claim 6, further including comparing the performance variable to a default RF performance variable and calibrating the one or more operating parameters of the PEPS system based on the comparison.

10. The method of claim 6, wherein the performance variable is a received signal strength indicator (RSSI).

11. The method of claim 9, wherein the one or more operating parameters of the PEPS system include distance-to-signal strength values used to determine a location of the mobile wireless device relative to the vehicle.

12. The method of claim 9, wherein the one or more operating parameters of the PEPS system include one or more virtual zone boundaries.

13. The method of claim 1, further including comparing the RF performance characteristics of the mobile wireless device to default RF performance characteristics stored in the PEPS system, and calibrating the one or more operating parameters of the PEPS system based on the comparison.

14. The method of claim 1, wherein the step of authenticating includes an exchange of virtual keys authorizing the mobile wireless device to access the vehicle, operate the vehicle, or both.

15. The method of claim 1, wherein the step of calibrating includes:
 transmitting a plurality of signals to the mobile wireless device at the fixed location in the vehicle using at least one of a Bluetooth Low Energy (LE) protocol, an IEEE 802.11 protocol, or both; and
 receiving a plurality of response signals from the mobile wireless device, wherein the plurality of response signals includes a received signal strength detected at the mobile wireless device in response to the plurality of transmitted signals, or calibration information relating to the one or more operating parameters calculated at the mobile wireless device in response to the plurality of transmitted signals.

16. A method of calibrating a passive entry passive start (PEPS) system of a vehicle with respect to mobile wireless devices authorized for use with the PEPS system, the method comprising the steps of:
 (a) authenticating the mobile wireless device authorizing the mobile wireless device to access the vehicle, operate the vehicle, or both;
 (b) in response to step (a), initiating a calibration procedure and prompting a user to place the mobile wireless device at an interface communicatively coupled with the PEPS system, wherein the interface is positioned at a fixed location in an interior of the vehicle, such that the PEPS system is calibrated with respect to each mobile wireless device authorized for use with the PEPS system from the same fixed location in the vehicle;
 (c) determining radio frequency (RF) performance characteristics of the mobile wireless device based on one or more calibration signals communicated between the mobile wireless device and the vehicle using at least one of a Bluetooth Low Energy (LE) protocol, an IEEE 802.11 protocol, or both; and
 (d) calibrating one or more operating parameters of the PEPS system used to determine a location of the mobile wireless device based on the RF performance characteristics of the mobile wireless device determined in step (c).

17. The method of claim 16, wherein determining the RF performance characteristics included determining a received signal strength indicator (RSSI) based on the one or more calibration signals.

18. The method of claim 16, further including comparing the RF performance characteristics of the mobile wireless device to default baseline RF performance characteristics stored in the PEPS system, and calibrating the one or more operating parameters of the PEPS system based on the comparison.

19. The method of claim 16, wherein the one or more operating parameters of the PEPS system include distance-to-signal strength values used to determine a location of the mobile wireless device relative to the vehicle.

20. A passive entry passive start (PEPS) system for a vehicle, the system comprising:

a vehicle system module configured to determine a location of a mobile wireless device relative to the vehicle, the vehicle system module configured to:

authenticate the mobile wireless device authorizing the mobile wireless device to access the vehicle, operate the vehicle, or both;

in response to authentication, initiate a calibration procedure and prompt a user to place the mobile wireless device at an interface communicatively coupled with the PEPS system, wherein the interface is positioned at a fixed location in an interior of the vehicle, such that the PEPS system is calibrated with respect to each mobile wireless device authorized for use with the PEPS system from the same fixed location in the vehicle;

determine radio frequency (RF) performance characteristics of the mobile wireless device based on one or more calibration signals communicated between the mobile wireless device and the vehicle using at least one of a Bluetooth Low Energy (LE) protocol, an IEEE 802.11 protocol, or both; and calibrate one or more operating parameters of the PEPS system used to determine the location of the mobile wireless device based on the RF performance characteristics of the mobile wireless device determined using the one or more calibration signals.

* * * * *